United States Patent
Chaudhari et al.

(10) Patent No.: US 11,669,385 B2
(45) Date of Patent: Jun. 6, 2023

(54) POWER ERROR MONITORING AND REPORTING WITHIN A SYSTEM ON CHIP FOR FUNCTIONAL SAFETY

(71) Applicant: Intel Corporation, Santa Clara, CA (US)

(72) Inventors: Prashant D. Chaudhari, Folsom, CA (US); Bradley T. Coffman, Hillsboro, OR (US); Gustavo P. Espinosa, Portland, OR (US); Ivan Rodrigo Herrera Mejia, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 16/556,565

(22) Filed: Aug. 30, 2019

(65) Prior Publication Data

US 2019/0391868 A1 Dec. 26, 2019

(51) Int. Cl.
*G06F 11/00* (2006.01)
*G06F 11/07* (2006.01)
*G06F 11/30* (2006.01)
*G06F 1/30* (2006.01)
*G05F 1/56* (2006.01)
*G05F 1/575* (2006.01)

(52) U.S. Cl.
CPC .......... *G06F 11/0793* (2013.01); *G05F 1/562* (2013.01); *G05F 1/575* (2013.01); *G06F 1/30* (2013.01); *G06F 11/3058* (2013.01)

(58) Field of Classification Search
CPC ............. G06F 11/0793; G06F 11/3058; G06F 11/0721; G06F 11/0772; G06F 11/0784; G06F 1/30; G06F 1/28; G06F 1/305; G05F 1/562; G05F 1/575
USPC ........................................................ 714/1–57
See application file for complete search history.

(56) References Cited

U.S. PATENT DOCUMENTS

| | | | |
|---|---|---|---|
| 6,195,754 B1 * | 2/2001 | Jardine | G06F 1/30 714/24 |
| 6,590,409 B1 * | 7/2003 | Hsiung | G01R 31/2853 324/754.21 |
| 2001/0039628 A1 * | 11/2001 | Koo | G06F 1/30 713/323 |
| 2002/0152425 A1 * | 10/2002 | Chai | G06F 11/0793 714/23 |

(Continued)

OTHER PUBLICATIONS

Chaudhari et al., Ips Soc Pll Monitoring and Error Reporting, U.S. Appl. No. 16/456,403, 48 p. U.S. Appl. No. 16/456,403.

*Primary Examiner* — Sarai E Butler
(74) *Attorney, Agent, or Firm* — Jordan IP Law, LLC

(57) ABSTRACT

Methods, systems and apparatuses may provide for technology that includes a system on chip (SoC) having an integrated voltage regulator and a power management controller, and a first communication path coupled to the power management controller, wherein the first communication path is to carry power error information to the power management controller. The technology may also include a second communication path coupled to an error pin of the SoC, wherein the second communication path is to carry the power error information to the error pin, and wherein the power error information is associated with the integrated voltage regulator.

25 Claims, 4 Drawing Sheets

(56) References Cited

U.S. PATENT DOCUMENTS

| | | | |
|---|---|---|---|
| 2005/0283686 A1* | 12/2005 | Dart | G11C 5/147 714/54 |
| 2006/0107150 A1* | 5/2006 | Onodera | G01R 31/31703 714/733 |
| 2007/0268639 A1* | 11/2007 | Cuzin | H02J 9/00 361/62 |
| 2009/0013215 A1* | 1/2009 | Kakihara | G06F 1/3268 714/43 |
| 2013/0205175 A1* | 8/2013 | Yamada | G06F 11/0772 714/57 |
| 2014/0181573 A1* | 6/2014 | Goss | H04L 45/021 710/305 |
| 2014/0281753 A1* | 9/2014 | Wagh | G06F 11/0745 714/56 |
| 2015/0149825 A1* | 5/2015 | Lucas | G06F 11/1441 714/22 |
| 2016/0098328 A1* | 4/2016 | Lucas | G06F 1/30 714/14 |
| 2019/0227585 A1* | 7/2019 | Tiedemann | H02H 9/04 |
| 2020/0117554 A1* | 4/2020 | Chaudhari | G06F 11/0721 |

\* cited by examiner

POWER ERROR MONITORING AND REPORTING WITHIN A SYSTEM ON CHIP FOR FUNCTIONAL SAFETY

TECHNICAL FIELD

Embodiments generally relate to monitoring power errors. More particularly, embodiments relate to power error monitoring and reporting within a system on chip (SoC) for functional safety (FuSA).

BACKGROUND

Functional safety is an area of concern in autonomous platforms (e.g., vehicles, aircraft) due to the unmanned nature of the platforms and the potential risk that the platforms present to end users. In such situations, functional logic may be monitored for errors so that the errors can be reported for corrective action purposes. When a transient or permanent fault occurs, however, in a power delivery element that supplies power to the functional logic, safety concerns may still exist. Such concerns may be particularly relevant when the power delivery element is integrated into an SoC (e.g., a fully integrated voltage regulator/FIVR).

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
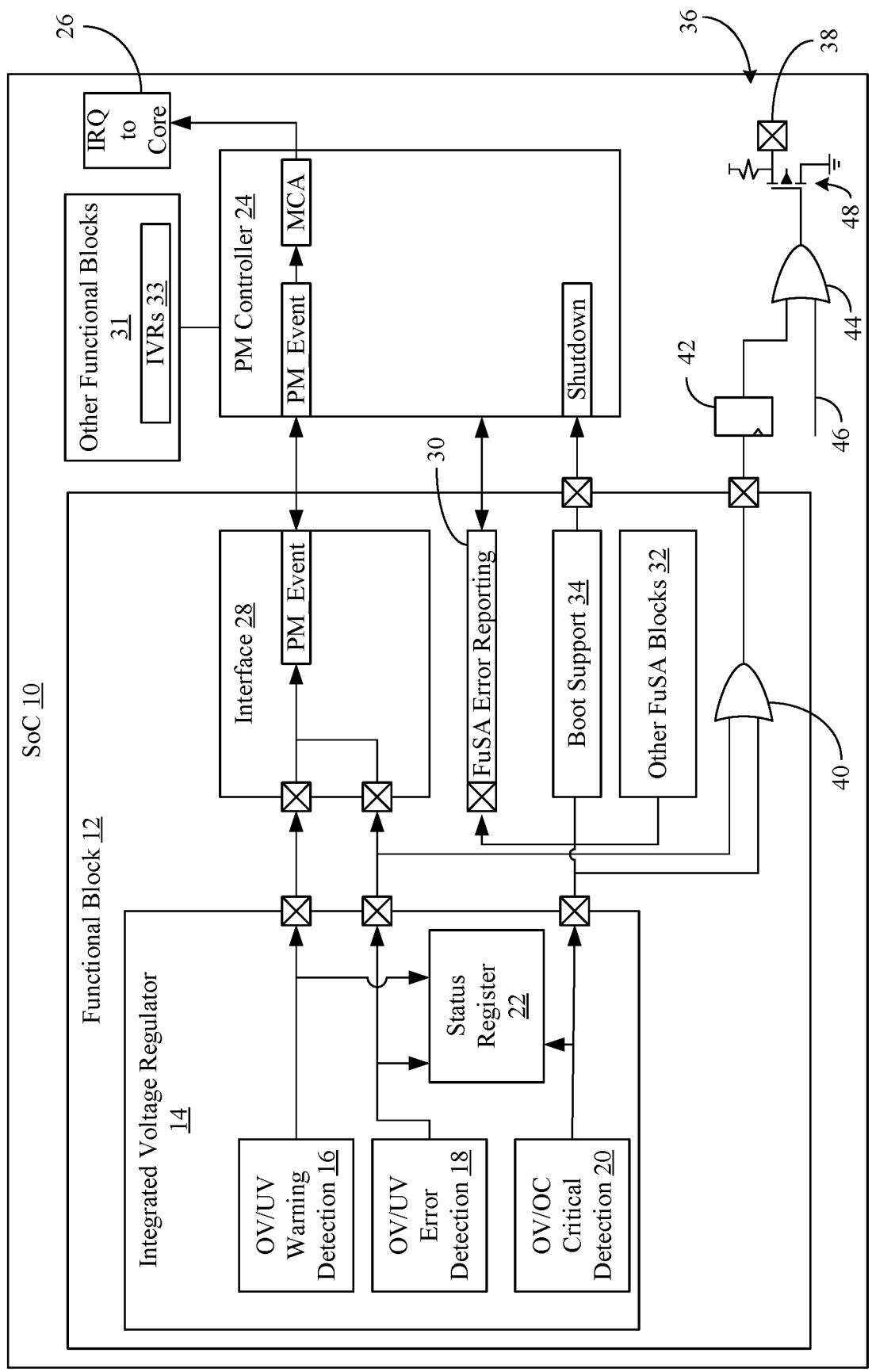
FIG. 1 is a block diagram of an example of an SoC according to an embodiment.

FIG. 1 shows an SoC 10 that may be used in an autonomous system and/or platform (e.g., vehicle, aircraft, spacecraft) having functional safety concerns. In the illustrated example, a functional block 12 (e.g., intellectual property/IP core) includes an integrated voltage regulator 14 (e.g., FIVR) that supplies power to the functional block 12. In an embodiment, the integrated voltage regulator 14 includes an over voltage (OV) and under voltage (UV) warning detection component 16 that generates a signal (e.g., error information) to indicate that the voltage (e.g., output voltage) of the integrated voltage regulator 14 has either exceeded an OV warning threshold or fallen below a UV warning threshold. Additionally, an OV/UV error detection component 18 may generate a signal indicating that the voltage of the integrated voltage regulator 14 has either exceeded an OV error threshold or fallen below a UV error threshold. The illustrated integrated voltage regulator 14 also includes an OV and over current (OC) critical detection component 20 to generate a signal indicating that either the voltage of the integrated voltage regulator 14 has reached a critical voltage level or the current (e.g., operating current) of the integrated voltage regulator 14 has reached a critical current level. The signals generated by the components 16, 18 and 20 may be used to populate a status register 22.

The SoC 10 may also include a power management (PM) controller 24, wherein the PM controller 24 uses a machine check architecture (MCA) to issue an interrupt request (IRQ) 26 in response to a power management event (PM_Event) corresponding to the signals from the warning detection component 16 or the error detection component 18. In this regard, the functional block 12 includes an interface 28 (e.g., PM adapter/PMA, control finite state machine/FSM) that is part of a communication path for the power error information from the integrated voltage regulator 14 to the PM controller 24. In one example, the interface 28 communicates with the PM controller 24 over a sideband (SB) custom on-chip switching fabric such as, for example, the INTEL On-chip System Fabric (IOSF). With regard to the signals from the critical detection component 20, a boot support interface 34 may issue a shutdown signal to the PM controller 24.

The functional block 12 may also include a FuSA error reporting component 30 that sends (e.g., over a custom on-chip switching fabric) error information from other FuSA blocks 32 to the PM controller 24. In the illustrated example, the other FuSA blocks 32 include other integrated voltage regulators (IVRs) 33 and corresponding PM interfaces. For example, the other IVRs 33 might include a second IVR that supplies power to a second functional block of the SoC 10, a third IVR that supplies power to a third functional block of the SoC 10, and so forth.

As will be discussed in greater detail, an additional communication path 36 may be provided from the error detection component 18 and the critical detection component 20 to an error pin 38 of the SoC 10. In an embodiment, the additional communication path 36 includes a logic gate such as, for example, a first OR gate 40 having inputs coupled to the output of the error detection component 18 and the critical detection component 20. Thus, the illustrated first OR gate 40 asserts a signal when the voltage of the integrated voltage regulator 14 has exceeded an OV error threshold, fallen below a UV error threshold, or reached a critical voltage level. The first OR gate 40 also asserts a signal when the current of the integrated voltage regulator 14 has reached a critical current level.

The additional communication path 36 may also include a latch 42 having an input coupled to the output of the first OR gate. In an embodiment, the latch 42 further enhances safety by recording the power error information when the power errors are transient in nature (e.g., radiation-based). The additional communication path 36 may also include a second OR gate 44 having an input coupled to the output of the latch 42 and one or more additional inputs 46 coupled to one or more additional error signal sources (e.g., other hardfaults). Additionally, a switch 48 (e.g., field effect transistor/FET) may be coupled to the output of the second OR gate 44 and the error pin 38. Thus, errors in the integrated voltage regulator 14 and/or the additional error signal sources may be detected at the error pin 38.

The additional communication path 36 therefore provides reporting redundancy that protects against functionality problems and/or errors in the communication path that includes the interface 28. For example, if the IOSF is non-operational or produces bit errors, the additional communication path 36 enables the power errors to be reported. Accordingly, the functional safety of the illustrated SoC 10 is enhanced in terms of permanent (e.g., gate degradation) or transient faults in the integrated voltage regulator 14.

Figure 2:
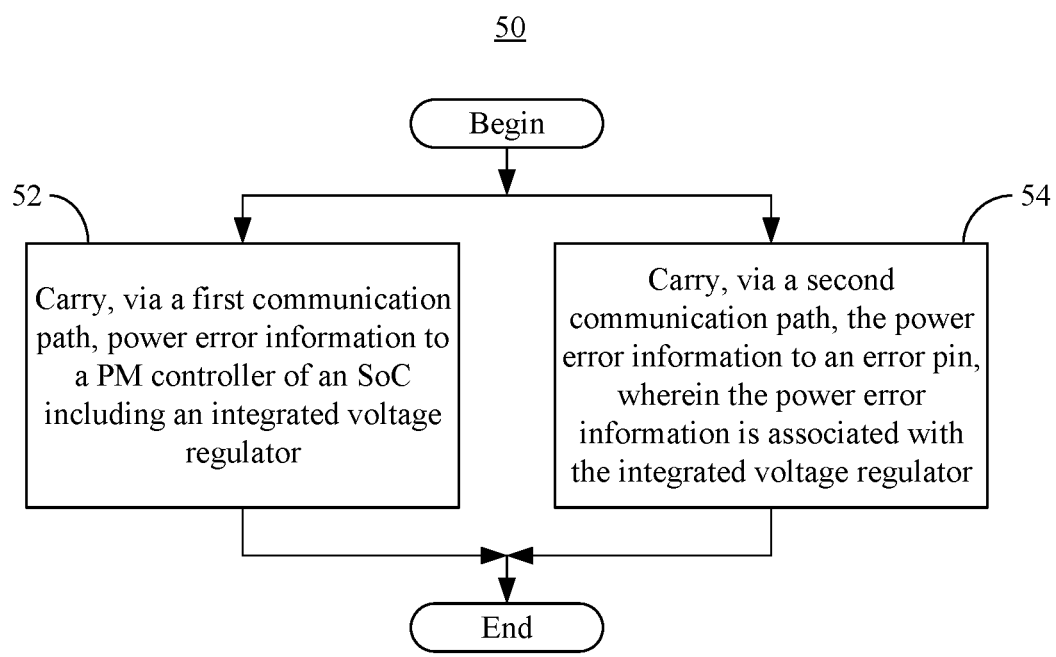
FIG. 2 is a flowchart of an example of a method of operating an SoC according to an embodiment.

FIG. 2 shows a method 50 of operating an SoC. The method 50 may generally be implemented in an SoC such as, for example, the SoC 10 (FIG. 1), already discussed. More particularly, the method 50 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 carries, via a first communication path, power error information to a PM controller of an SoC including an integrated voltage regulator. Additionally, processing block 54 provides for carrying, via a second communication path, the power error information to an error pin, wherein the power error information is associated with the integrated voltage regulator. The illustrated method 50 therefore provides reporting redundancy that protects against functionality problems and/or errors in the first communication path. For example, if the first communication path uses a custom on-chip switching fabric that is non-operational or produces bit errors, the second communication path enables the power errors to be reported and mitigated. Accordingly, the functional safety of the illustrated method 50 is enhanced in terms of permanent or transient faults in the integrated voltage regulator.

In one example, the power error information includes a first signal indicating that a voltage of the integrated voltage regulator has exceeded an OV threshold and/or a second signal indicating that the voltage of the integrated voltage regulator has fallen below an UV threshold. Moreover, the power error information may include a third signal indicating that the voltage of the integrated voltage regulator has reached a critical voltage level and/or a fourth signal indicating that a current of the integrated voltage regulator has reached a critical current level. Accordingly, a wide variety of power errors may be monitored and reported within the SoC for functional safety.

Figure 3:
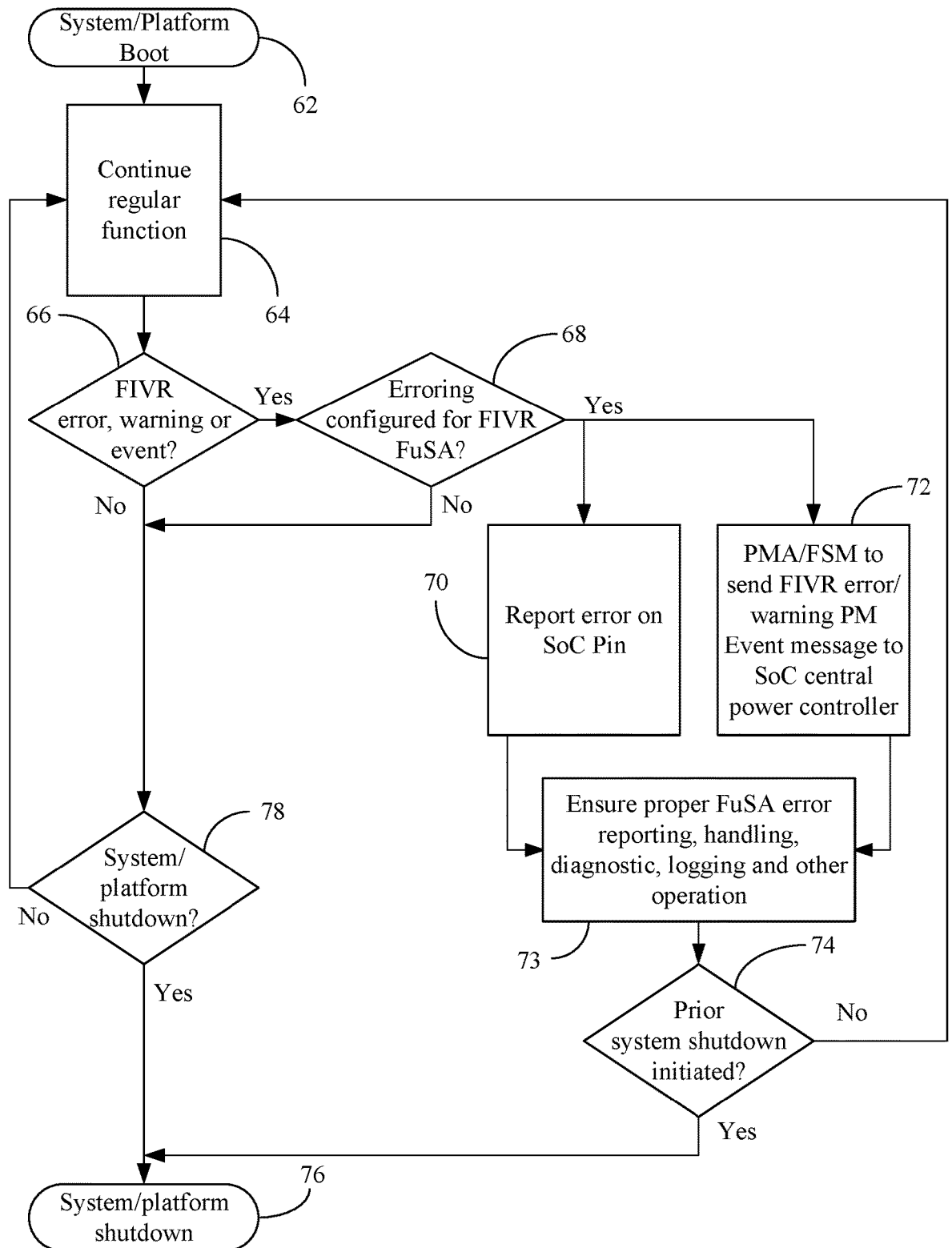
FIG. 3 is a flowchart of an example of a more detailed method of operating an SoC according to an embodiment.

FIG. 3 shows a more detailed method 60 of operating an SoC. The method 60 may generally be implemented in an SoC such as, for example, the SoC 10 (FIG. 1), already discussed. Moreover, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS, TTL technology, or any combination thereof.

A system/platform boot takes place at illustrated block 62, wherein regular function is continued at block 64. A determination may be made at block 66 as to whether a FIVR error, warning or event has occurred. If so, block 68 determines whether error reporting ("erroring") is configured for FIVR FuSA. If error reporting is configured for FIVR FuSA, illustrated block 70 reports the power error on the SoC error pin. In an embodiment, block 72 sends the FIFR error/warning as a PM event message to the SoC central power controller. Thus, blocks 70 and 72 may occur in parallel to achieve redundancy. Block 73 provides for ensuring proper FuSA error reporting, handling, diagnostic logging and other operations. In the illustrated example, a determination is made at block 74 as to whether a prior system shutdown has been initiated. If so, the method 60 conducts a system shutdown at block 76. Otherwise, the method 60 returns to regular functioning at block 64. If either it is determined at block 66 that a FIVR error, warning or event has not occurred or it is determined at block 68 that error reporting is not configured for FIVR FuSA, block 78 determines whether a system/platform is to be conducted. If so, the method 60 conducts a system shutdown at block 76. Otherwise, the method 60 returns to regular functioning at block 64.

Figure 4:
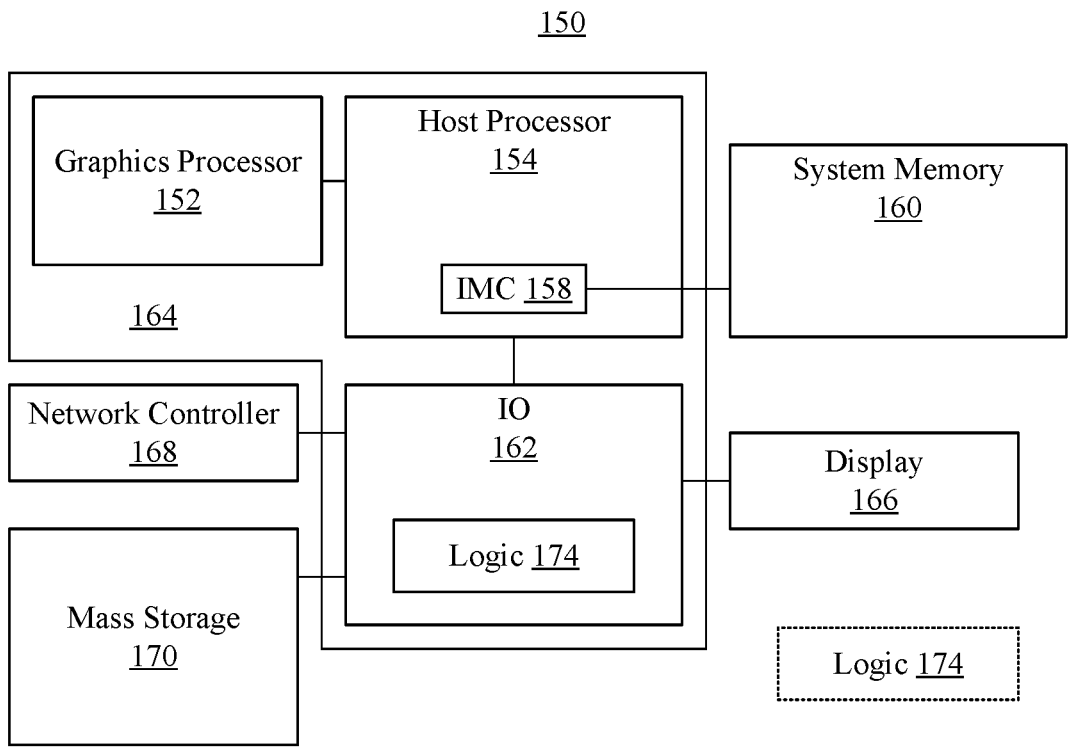
FIG. 4 is a block diagram of an example of a safety-enhanced computing system according to an embodiment.

FIG. 4 shows a computing system 150 that may generally be part of an electronic device/system having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), spacecraft functionality, etc., or any combination thereof. In the illustrated example, the system 150 includes a graphics processor 152 (e.g., graphics processing unit/GPU) and a host processor 154 (e.g., central processing unit/CPU) having an integrated memory controller (IMC) 158 that is coupled to a system memory 160.

Additionally, the illustrated system 150 includes an input output (IO) module 162 implemented together with the host processor 154, and the graphics processor 152 on an SoC 164 (e.g., semiconductor die). In one example, the IO module 162 communicates with a display 166 (e.g., touch screen, liquid crystal display/LCD, light emitting diode/LED display), a network controller 168 (e.g., wired and/or wireless), and mass storage 170 (e.g., hard disk drive/HDD, optical disk, solid state drive/SSD, flash memory).

The illustrated IO module 162 includes logic 174 (e.g., logic instructions, configurable logic, fixed-functionality hardware logic, etc., or any combination thereof) to perform one or more aspects of the method 50 (FIG. 2) and/or the method 60 (FIG. 3), already discussed. Thus, the logic 174 may include a system on chip (SoC) including an integrated voltage regulator and a power management controller, and a first communication path coupled to the power management controller, wherein the first communication path is to carry power error information to the power management controller. The logic 174 may also include a second communication path coupled to an error pin, wherein the second communication path is to carry the power error information to the error pin, and wherein the power error information is associated with the integrated voltage regulator. The computing system 150 is therefore safety-enhanced to the extent that it provides reporting redundancy that protects against functionality problems and/or errors in the first communication path. For example, if the first communication path uses a custom on-chip switching fabric that is non-operational or produces bit errors, the second communication path enables the power errors to be reported. Accordingly, the functional safety of the illustrated computing system 150 is enhanced in terms of permanent or transient faults in the integrated voltage regulator.

Figure 5:
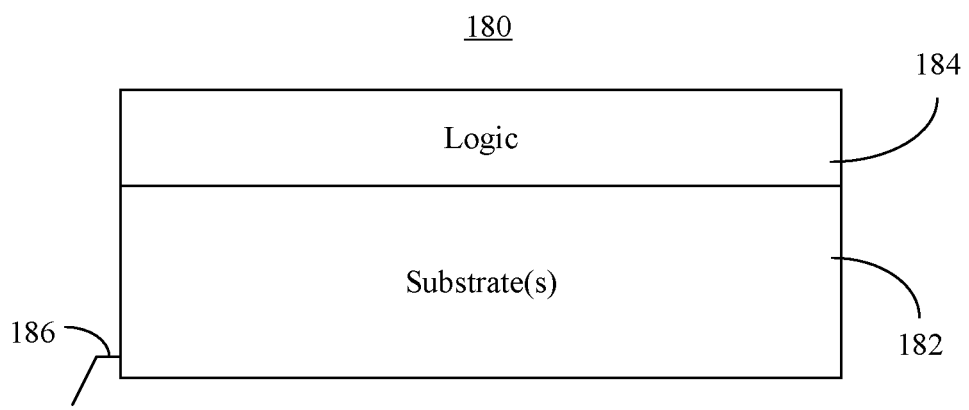
FIG. 5 is an illustration of an example of a semiconductor apparatus according to an embodiment.

FIG. 5 shows a semiconductor apparatus 180 (e.g., chip, die, package). The illustrated apparatus 180 includes one or more substrates 182 (e.g., silicon, sapphire, gallium arsenide) and logic 184 (e.g., transistor array and other integrated circuit/IC components) coupled to the substrate(s) 182. In an embodiment, the one or more substrates 182 include an error pin 186. Additionally, the logic 184 may implement one or more aspects of the method 50 (FIG. 2) and/or the method 60 (FIG. 3), already discussed. Thus, the logic 184 may include a system on chip (SoC) having an integrated voltage regulator and a power management controller, and a first communication path coupled to the power management controller, wherein the first communication path is to carry power error information to the power management controller. The logic 184 may also include a second communication path coupled to the error pin 186, wherein the second communication path is to carry the power error information to the error pin, and wherein the power error information is associated with the integrated voltage regulator.

The semiconductor apparatus 180 is therefore safety-enhanced to the extent that it provides reporting redundancy that protects against functionality problems and/or errors in the first communication path. For example, if the first communication path uses a custom on-chip switching fabric that is non-operational or produces bit errors, the second communication path enables the power errors to be reported. Accordingly, the functional safety of the illustrated semiconductor apparatus 180 is enhanced in terms of permanent or transient faults in the integrated voltage regulator The logic 184 may be implemented at least partly in configurable logic or fixed-functionality hardware logic. In one example, the logic 184 includes transistor channel regions that are positioned (e.g., embedded) within the substrate(s) 182. Thus, the interface between the logic 184 and the substrate(s) 182 may not be an abrupt junction. The logic 184 may also be considered to include an epitaxial layer that is grown on an initial wafer of the substrate(s) 182.

ADDITIONAL NOTES AND EXAMPLES

Example 1 includes a semiconductor apparatus comprising one or more substrates including an error pin, and logic coupled to the one or more substrates, wherein the logic is implemented at least partly in one or more of configurable logic or fixed-functionality logic hardware and includes a system on chip (SoC) including an integrated voltage regulator and a power management controller, wherein the integrated voltage regulator is to supply power to a functional block of the SoC, a first communication path coupled to the power management controller, wherein the first communication path is to carry power error information to the power management controller, and a second communication path coupled to the error pin, wherein the second communication path is to carry the power error information to the error pin, wherein the power error information is associated with the integrated voltage regulator, and wherein the power error information is to include one or more of a first signal indicating that a voltage of the integrated voltage regulator has exceeded an over voltage threshold, a second signal indicating that the voltage of the integrated voltage regulator has fallen below an under voltage threshold, a third signal indicating that the voltage of the integrated voltage regulator has reached a critical voltage level, or a fourth signal indicating that a current of the integrated voltage regulator has reached a critical current level.

Example 2 includes the semiconductor apparatus of Example 1, wherein the second communication path includes a first OR gate, a latch having an input coupled to an output of the first OR gate, a second OR gate having an input coupled to an output of the latch and one or more additional inputs coupled to one or more additional error signal sources, and a switch coupled to an output of the second OR gate and the error pin.

Example 3 includes the semiconductor apparatus of any one of Examples 1 to 2, wherein the integrated voltage regulator is a fully integrated voltage regulator (FIVR).

Example 4 includes a safety-enhanced computing system comprising a network controller, a semiconductor apparatus coupled to the network controller, the semiconductor apparatus including logic coupled to one or more substrates, wherein the logic includes a system on chip (SoC) including an integrated voltage regulator and a power management controller, wherein the integrated voltage regulator is to supply power to a functional block of the SoC, a first communication path coupled to the power management controller, wherein the first communication path is to carry power error information to the power management controller, and a second communication path coupled to an error pin, wherein the second communication path is to carry the power error information to the error pin, and wherein the power error information is associated with the integrated voltage regulator.

Example 5 includes the computing system of Example 4, wherein the power error information is to include a signal indicating that a voltage of the integrated voltage regulator has exceeded an over voltage threshold.

Example 6 includes the computing system of Example 4, wherein the power error information is to include a signal indicating that a voltage of the integrated voltage regulator has fallen below an under voltage threshold.

Example 7 includes the computing system of Example 4, wherein the power error information is to include a signal indicating that a voltage of the integrated voltage regulator has reached a critical voltage level.

Example 8 includes the computing system of Example 4, wherein the power error information is to include a signal indicating that a current of the integrated voltage regulator has reached a critical current level.

Example 9 includes the computing system of Example 4, wherein the second communication path further includes a first OR gate, a latch having an input coupled to an output of the first OR gate, a second OR gate having an input coupled to an output of the latch and one or more additional inputs coupled to one or more additional error signal sources, and a switch coupled to an output of the second OR gate and the error pin.

Example 10 includes the computing system of any one of Examples 4 to 9, wherein the integrated voltage regulator is a fully integrated voltage regulator (FIVR).

Example 11 includes a semiconductor apparatus comprising one or more substrates including an error pin, and logic coupled to the one or more substrates, wherein the logic is implemented at least partly in one or more of configurable logic or fixed-functionality logic hardware and includes a system on chip (SoC) including a first integrated voltage regulator and a power management controller, wherein the first integrated voltage regulator is to supply power to a first functional block of the SoC, a first communication path coupled to the power management controller, wherein the first communication path is to carry power error information to the power management controller, and a second communication path coupled to the error pin, wherein the second communication path is to carry the power error information to the error pin, and wherein the power error information is associated with the first integrated voltage regulator.

Example 12 includes the semiconductor apparatus of Example 11, wherein the power error information is to include a signal indicating that a voltage of the first integrated voltage regulator has exceeded an over voltage threshold.

Example 13 includes the semiconductor apparatus of Example 11, wherein the power error information is to include a signal indicating that a voltage of the first integrated voltage regulator has fallen below an under voltage threshold.

Example 14 includes the semiconductor apparatus of Example 11, wherein the power error information is to include a signal indicating that a voltage of the first integrated voltage regulator has reached a critical voltage level.

Example 15 includes the semiconductor apparatus of Example 11, wherein the power error information is to include a signal indicating that a current of the first integrated voltage regulator has reached a critical current level.

Example 16 includes the semiconductor apparatus of Example 11, wherein the second communication path includes a first OR gate, a latch having an input coupled to an output of the first OR gate, a second OR gate having an input coupled to an output of the latch and one or more additional inputs coupled to one or more additional error signal sources, and a switch coupled to an output of the second OR gate and the error pin.

Example 17 includes the semiconductor apparatus of any one of Examples 11 to 16, wherein the SoC further includes a second integrated voltage regulator to supply power to a second functional block of the SoC.

Example 18 includes the semiconductor apparatus of Example 17, wherein the first integrated voltage regulator and the second integrated voltage regulator are fully integrated voltage regulators (FIVRs).

Example 19 includes a method comprising carrying, via a first communication path, power error information to a power management controller of a system on chip (SoC) including an integrated voltage regulator, wherein the integrated voltage regulator supplies power to a functional block of the SoC, and carrying, via a second communication path, the power error information to an error pin, wherein the power error information is associated with the integrated voltage regulator.

Example 20 includes the method of Example 19, wherein the power error information includes a signal indicating that a voltage of the integrated voltage regulator has exceeded an over voltage threshold.

Example 21 includes the method of Example 19, wherein the power error information includes a signal indicating that a voltage of the integrated voltage regulator has fallen below an under voltage threshold.

Example 22 includes the method of Example 19, wherein the power error information includes a signal indicating that a voltage of the integrated voltage regulator has reached a critical voltage level.

Example 23 includes the method of Example 19, wherein the power error information includes a signal indicating that a current of the integrated voltage regulator has reached a critical current level.

Example 24 includes the method of Example 19, wherein the power error information is carried via a first OR gate, a latch having an input coupled to an output of the first OR gate, a second OR gate having an input coupled to an output of the latch and one or more additional inputs coupled to one or more additional error signal sources, and a switch coupled to an output of the second OR gate and the error pin.

Example 25 includes the method of any one of Examples 19 to 24, wherein the power error information is associated with a fully integrated voltage regulator (FIVR).

Technology described herein therefore improves overall reliability of FIVR functional safety error reporting from an IP core on an SOC. The FIVR error is also wired to SOC pin for an alternate path of error reporting, in the event that PMA non-functionality or errors occur on the primary messaging path. Accordingly, safety may be enhanced in over or under the surface/ground (e.g., robots, cars, bikes, motorcycles, trains, trucks, etc.), over the water (e.g., ships, etc.), under water (e.g., submarines, etc.), in the air (e.g. airplanes, drones, helicopters, etc.), in space (e.g., spacecraft, satellites, rovers, etc.) and/or other systems having vehicular functionality.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A semiconductor apparatus comprising: one or more substrates including an error pin; and logic coupled to the one or more substrates, wherein the logic is implemented at least partly in one or more of configurable logic or fixed-functionality logic hardware and includes: a system on chip (SoC) including an integrated voltage regulator and a power management controller, wherein the integrated voltage regulator is to supply power to a functional block of the SoC, a first communication path coupled to the power management controller, wherein the first communication path is to carry power error information to the power management controller so that at least two signals of the power error information are separately carried to the power management controller along different portions of the first communication path, and a second communication path coupled to the error pin and that includes a first OR gate, wherein the second communication path is to carry the power error information to the error pin so that the at least two signals of the power error information are provided as inputs to the first OR gate to be carried to the error pin, wherein the power error information is associated with the integrated voltage regulator, and wherein the at least two signals of the power information is to include one or more of a first signal indicating that a voltage of the integrated voltage regulator has exceeded an over voltage threshold, a second signal indicating that the voltage of the integrated voltage regulator has fallen below an under voltage threshold, a third signal indicating that the voltage of the integrated voltage regulator has reached a critical voltage level, or a fourth signal indicating that a current of the integrated voltage regulator has reached a critical current level.

2. The semiconductor apparatus of claim 1, wherein the second communication path includes:
   a latch having an input coupled to an output of the first OR gate,
   a second OR gate having an input coupled to an output of the latch and one or more additional inputs coupled to one or more additional error signal sources, and
   a switch coupled to an output of the second OR gate and the error pin.

3. The semiconductor apparatus of claim 1, wherein the integrated voltage regulator is a fully integrated voltage regulator (FIVR).

4. A computing system comprising:
   a network controller;
   a semiconductor apparatus coupled to the network controller, the semiconductor apparatus including logic coupled to one or more substrates, wherein the logic includes:
   a system on chip (SoC) including an integrated voltage regulator and a power management controller, wherein the integrated voltage regulator is to supply power to a functional block of the SoC,
   a first communication path coupled to the power management controller, wherein the first communication path is to carry power error information to the power management controller so that at least two signals of the power error information are separately carried to the power management controller along different portions of the first communication path, and
   a second communication path coupled to an error pin and that includes a first OR gate, wherein the second communication path is to carry the power error information to the error pin so that the at least two signals of the power error information are provided as inputs to the first OR gate to be carried to the error pin, and wherein the power error information is associated with the integrated voltage regulator.

5. The computing system of claim 4, wherein the at least two signals of the power information are to include a signal indicating that a voltage of the integrated voltage regulator has exceeded an over voltage threshold.

6. The computing system of claim 4, wherein the at least two signals of the power information are to include a signal indicating that a voltage of the integrated voltage regulator has fallen below an under voltage threshold.

7. The computing system of claim 4, wherein the at least two signals of the power information are to include a signal indicating that a voltage of the integrated voltage regulator has reached a critical voltage level.

8. The computing system of claim 4, wherein the at least two signals of the power information are to include a signal indicating that a current of the integrated voltage regulator has reached a critical current level.

9. The computing system of claim 4, wherein the second communication path further includes:
   a latch having an input coupled to an output of the first OR gate,
   a second OR gate having an input coupled to an output of the latch and one or more additional inputs coupled to one or more additional error signal sources, and
   a switch coupled to an output of the second OR gate and the error pin.

10. The computing system of claim 4, wherein the integrated voltage regulator is a fully integrated voltage regulator (FIVR).

11. A semiconductor apparatus comprising:
    one or more substrates including an error pin; and
    logic coupled to the one or more substrates, wherein the logic is implemented at least partly in one or more of configurable logic or fixed-functionality hardware logic and includes:
    a system on chip (SoC) including a first integrated voltage regulator and a power management controller, wherein the first integrated voltage regulator is to supply power to a first functional block of the SoC,
    a first communication path coupled to the power management controller, wherein the first communication path is to carry power error information to the power management controller so that at least two signals of the power error information are separately carried to the power management controller along different portions of the first communication path, and a second communication path coupled to the error pin and that includes a first OR gate, wherein the second communication path is to carry the power error information to the error pin so that the at least two signals of the power error information are provided as inputs to the first OR gate to be carried to the error pin, and wherein the power error information is associated with the first integrated voltage regulator.

12. The semiconductor apparatus of claim 11, wherein the at least two signals of the power information are to include a signal indicating that a voltage of the first integrated voltage regulator has exceeded an over voltage threshold.

13. The semiconductor apparatus of claim 11, wherein the at least two signals of the power information are to include a signal indicating that a voltage of the first integrated voltage regulator has fallen below an under voltage threshold.

14. The semiconductor apparatus of claim 11, wherein the at least two signals of the power information are to include a signal indicating that a voltage of the first integrated voltage regulator has reached a critical voltage level.

15. The semiconductor apparatus of claim 11, wherein the at least two signals of the power information are to include a signal indicating that a current of the first integrated voltage regulator has reached a critical current level.

16. The semiconductor apparatus of claim 11, wherein the second communication path includes:
   a latch having an input coupled to an output of the first OR gate,
   a second OR gate having an input coupled to an output of the latch and one or more additional inputs coupled to one or more additional error signal sources, and
   a switch coupled to an output of the second OR gate and the error pin.

17. The semiconductor apparatus of claim 11, wherein the SoC further includes a second integrated voltage regulator to supply power to a second functional block of the SoC.

18. The semiconductor apparatus of claim 17, wherein the first integrated voltage regulator and the second integrated voltage regulator are fully integrated voltage regulators (FIVRs).

19. A method comprising:
   carrying, via a first communication path, power error information to a power management controller of a system on chip (SoC) including an integrated voltage regulator so that at least two signals of the power error information are separately carried to the power management controller along different portions of the first communication path, wherein the integrated voltage regulator supplies power to a functional block of the SoC; and
   carrying, via a second communication path that includes a first OR gate, the power error information to an error pin so that the at least two signals of the power error information are provided as inputs to the first OR gate to be carried to the error pin, wherein the power error information is associated with the integrated voltage regulator.

20. The method of claim 19, wherein the at least two signals of the power information include a signal indicating that a voltage of the integrated voltage regulator has exceeded an over voltage threshold.

21. The method of claim 19, wherein the at least two signals of the power information include a signal indicating that a voltage of the integrated voltage regulator has fallen below an under voltage threshold.

22. The method of claim 19, wherein the at least two signals of the power information include a signal indicating that a voltage of the integrated voltage regulator has reached a critical voltage level.

23. The method of claim 19, wherein the at least two signals of the power information include a signal indicating that a current of the integrated voltage regulator has reached a critical current level.

24. The method of claim 19, wherein the power error information is carried via the first OR gate, a latch having an input coupled to an output of the first OR gate, a second OR gate having an input coupled to an output of the latch and one or more additional inputs coupled to one or more additional error signal sources, and a switch coupled to an output of the second OR gate and the error pin.

25. The method of claim 19, wherein the power error information is associated with a fully integrated voltage regulator (FIVR).

* * * * *